United States Patent
Satoh et al.

[11] Patent Number: 6,076,034
[45] Date of Patent: Jun. 13, 2000

[54] VEHICLE DRIVING CONTROLLER

[75] Inventors: Yoshihiro Satoh, Kanagawa-ken; Hiroshi Takahashi, Tokyo, both of Japan

[73] Assignee: Nissan Motor Co., Ltd., Kanagawa-ken, Japan

[21] Appl. No.: 09/110,331

[22] Filed: Jul. 6, 1998

[30] Foreign Application Priority Data

Jul. 7, 1997  [JP]  Japan ................................ 9-181414

[51] Int. Cl.⁷ ................ B60T 7/12; B60T 8/24
[52] U.S. Cl. .................. 701/70; 701/78; 701/211; 180/168
[58] Field of Search ................ 701/70, 72, 78, 701/41, 208, 210, 211, 205; 180/168

[56] References Cited

U.S. PATENT DOCUMENTS

| | | | |
|---|---|---|---|
| 5,661,650 | 8/1997 | Sekine | 701/23 |
| 5,904,725 | 5/1999 | Iisaka et al. | 701/207 |
| 5,978,731 | 11/1999 | Matsuda | 701/208 |

FOREIGN PATENT DOCUMENTS 6-324138  11/1994  Japan.

*Primary Examiner*—Tan Nguyen
*Attorney, Agent, or Firm*—McDermott, Will & Emery

[57] ABSTRACT

A vehicle driving controller for reducing a feeling of incompatibility of a driver is disclosed. Such a vehicle driving controller has a first detecting section for detecting a drive environment of a vehicle, a second detecting section for detecting a throttle opening of the vehicle, a driving control signal calculating section for outputting a driving control signal through calculations based on an output signal relating to the drive environment of the vehicle from the first detecting section in response to an output signal of the second detecting section relating to the throttle opening of the vehicle, and a driving control section for controlling driving of the vehicle on the basis of the driving control signal outputted from the driving control signal calculating section.

11 Claims, 5 Drawing Sheets

VEHICLE DRIVING CONTROLLER

The contents of Application No. TOKUGANHEI 9-181414, with a filing date of Jul. 7, 1997 in Japan, are hereby incorporated by reference.

BACKGROUND OF THE INVENTION

1. Field of the Invention

The present invention relates to a vehicle driving controller and particularly relates to a vehicle driving controller for controlling the operation of a vehicle matching with a driver's will or intention.

2. Description of the Related Art

A conventional known vehicle driving controller is described in Japanese Patent Application Laid-Open No. 6-324138.

This conventional vehicle driving controller judges which road kinds of a highway, a winding road and a rough road a self-vehicle is driven on from an absolute position of the self-vehicle given by a GPS (Global Positioning System) receiver and map information.

The vehicle driving controller performs various kinds of vehicle controls in 4WD (four wheels driving) system, 4WS (four wheels steering), suspension, etc. by reflecting the results of this judgment.

However, this conventional vehicle driving controller is merely constructed so as to detect a kind of a road around the vehicle, more generally, a drive environment around the vehicle to reflect this detected drive environment in various vehicle controls.

Namely, in such a controller, the driver's intention is not estimated at all and a uniform control is simply generally performed with respect to all drivers.

Therefore, there is a case in which such a uniform control does not match with the driver's intention sufficiently and a sense of incompatibility is given to the driver.

SUMMARY OF THE INVENTION

An object of the present invention is to provide a vehicle driving controller capable of performing decelerating control matching with a driver's will or intention sufficiently by estimating a decelerating will or intention of the driver on the basis of an environmental condition around a vehicle and performing a decelerating control in accordance with this estimation.

Namely, the present invention typically resides in a vehicle driving controller comprising a first detecting section for detecting a drive environment of a vehicle, a second detecting section for detecting a throttle opening of the vehicle, a driving control signal calculating section for outputting a driving control signal through calculations based on an output signal relating to the drive environment of the vehicle from the first detecting section in response to an output signal relating to the throttle opening of the vehicle from the second detecting section, and a driving control section for controlling driving of the vehicle on the basis of a driving control signal outputted from the driving control signal calculating section.

In such a main construction, it is possible to perform driving control matching with a driver's intention by judging the driver's intention in response to an increasing operation or a decreasing operation for the throttle opening.

Specifically, the present invention can include such an aspect that the first detecting section has a curved road detecting section for detecting information about a forward curved road on a driving road of the vehicle. Here, the driving control signal calculating section outputs the driving control signal for controlling an increase in deceleration of the vehicle when the curved road detecting section detects presence of the curved road and the second detecting section detects a full close state of the throttle opening of the vehicle. And the driving control section controls the vehicle so as to increase the deceleration of the vehicle by receiving the driving control signal for controlling of the increase in deceleration of the vehicle.

According to such an aspect, decelerating intention of the driver can be suitably estimated and control of a deceleration stronger or larger than a normal deceleration is performed in response to a decelerating operation conducted by the driver. Accordingly, it is possible to perform a deceleration control which reflects the decelerating intention of the driver sufficiently.

More specifically, the present invention also includes such an aspect that the first detecting section has a curved road detecting section for detecting information about a forward curved road in a driving road front of a course of the vehicle, and, when the curved road detecting section detects the forward curved road on the course of the vehicle and the second detecting section detects an intermediate closed state of the throttle opening of the vehicle, the driving control signal calculating section is constructed so as to judge the presence or absence of the decelerating intention of the driver with reference to a learning value which has been stored.

According to such an aspect, the presence or absence of the decelerating intention of the driver is judged with reference to characteristics of the past driving operations of the driver in a similar situation so that the driver's intention can be suitably reflected in an operation of the driving control signal calculating section.

Here, the learning value can relate to the driving control signal, a starting position of the deceleration of the vehicle just before the advance into the curved road, the distance from the starting position of the deceleration of the vehicle to the curved road, the advancing speed of the vehicle into the curved road, and the curvature of the curved road, and each of average values of these values.

Especially, in such a case, the learning value desirably relates to a previous starting position of deceleration of the vehicle moving into a curved road and an previous advancing speed of the vehicle into a curved road so as to suitably reflect the decelerating intention of the driver. And the driving control signal calculating section outputs a driving control signal for controlling an increase in deceleration of the vehicle when the driving control signal calculating section judges that the driver has the decelerating intention, and the driving control section controls the vehicle so as to increase the deceleration of the vehicle by receiving the driving control signal for controlling of the increase in deceleration of the vehicle.

Accordingly, when it is judged that the driver has a decelerating intention, control of deceleration stronger or larger than a normal deceleration is performed so that a deceleration control which reflects the decelerating intention of the driver sufficiently can be performed.

More specifically, the present invention can adopt an aspect in which the first detecting section has a curved road detecting section for detecting information about a forward curved road in a driving road of a course of the vehicle. And, when the curved road detecting section newly detects the next curved road after the detection of termination of the detected curved road and when the driving control signal calculating section judges that the distance between the vehicle and the next curved road is equal to or greater than a predetermined distance, the driving control signal calculating section outputs a driving control signal for stopping control of an increase in deceleration of the vehicle.

According to such an aspect, the driving control can be continued or stopped suitably after the vehicle passed through the curved road.

More specifically, the present invention can involve an aspect in which the first detecting section has a curved road detecting section for detecting information about a forward curved road on a driving course of the vehicle. And when the curved road detecting section newly detects the next curved road after the detection of termination of the detected curved road and when the driving control signal calculating section judges that the distance between the vehicle and the next curved road is smaller than a first distance and is equal to or greater than a second distance a value of which is smaller than that of the first distance, the driving control signal calculating section judges presence or absence of acceleration or deceleration intention of the driver of the vehicle and outputs a driving control signal for stopping controlling of an increase in deceleration of the vehicle on the basis of the results of the judgment.

According to such an aspect, the driving control can be continued or stopped more suitably by further reflecting the driver's intention after the vehicle passed through the curved road.

Here, it is preferable to further reflect the driver's intention that the driving control signal calculating section judges the presence or absence of the acceleration or deceleration intention of the driver of the vehicle by comparing the throttle opening of the vehicle detected by the second detecting section and the throttle opening required to maintain the current speed of the vehicle.

More specifically, the present invention can include an aspect in which the first detecting section has a curved road detecting section for detecting information about a forward curved road on a driving road of the vehicle and also has a peripheral vehicle detecting section for detecting information about a near vehicle around the self-vehicle. And, when the curved road detecting section newly detects the next curved road after the detection of termination of the detected curved road, the driving control signal calculating section outputs a driving control signal for stopping controlling an increase in deceleration of the vehicle on the basis of the distance between the vehicle and the next curved road detected by the curved road detecting section, and the information about the near vehicle detected by the peripheral vehicle detecting section.

In such an aspect, the driving control can be continued or stopped more suitably by further suitably reflecting the driver's intention after the vehicle passed through the curved road.

Here, the information about the near vehicle is preferably constructed by a distance between the self-vehicle and the near vehicle, and is also preferably a relative velocity between the self-vehicle and the near vehicle. Further, the information of the near vehicle may include both this distance and this relative velocity.

DETAILED DESCRIPTION OF THE PREFERRED EMBODIMENTS

The embodiments of the present invention will now be described in detail with suitable reference to the drawings.

Figure 1:
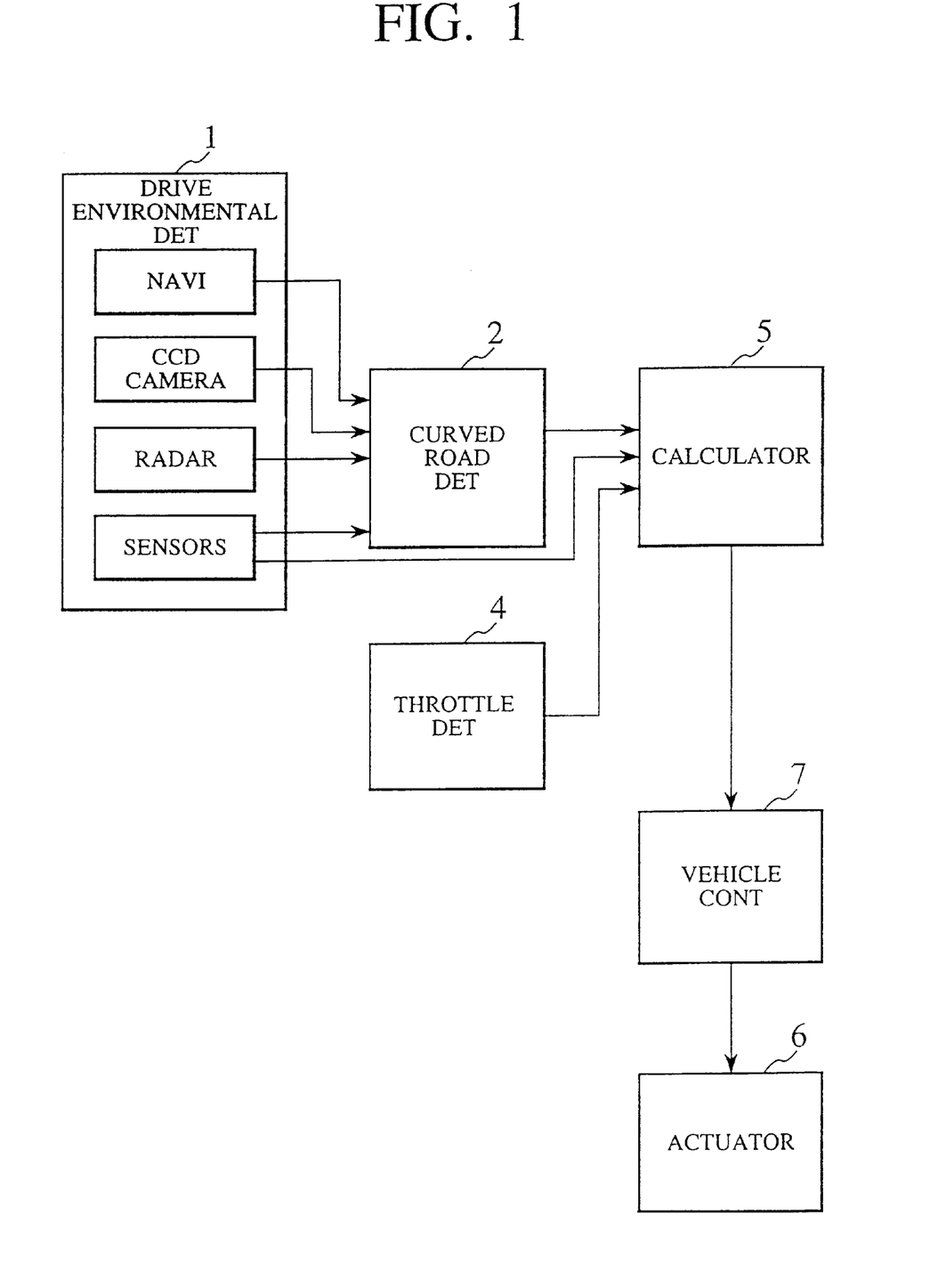
FIG. 1 is a block diagram showing the functional construction of a vehicle driving controller in a first embodiment of the present invention.

FIG. 1 is a block diagram showing the functional construction of a vehicle driving controller according to a first embodiment of the present invention.

In FIG. 1, first, the vehicle driving controller in this embodiment is provided with a drive environmental detecting section 1 shown as DRIVE ENVIRONMENTAL DET for detecting an environment around a self-vehicle, e.g., a position of the self-vehicle stopped or driven, a road condition for the self-vehicle and other vehicles around the self-vehicle as a main object.

The vehicle driving controller is also provided with a curved road detecting section 2 shown as CURVED ROAD DET for detecting presence or absence of a forward curved road on a course of the vehicle and a distance up to this curved road as a main object on the basis of detecting information detected by the drive environmental detecting section 1.

It can be the that the above drive environmental detecting section 1 and the above curved road detecting section 2 constitute a first detecting section for detecting a so-called drive environment of the self-vehicle.

Further, the vehicle driving controller includes a throttle opening detecting section 4 shown as THROTTLE DET, serving as a second detecting section, for detecting the opening degree of a throttle opened in response to an accelerator operation effected by a driver.

Further, the vehicle driving controller includes a driving control signal calculating section 5 shown as CALCULATOR for judging a driver's intention in a throttle operation by using a curved road detecting signal sent from the curved road detecting section 2, a throttle opening detecting signal sent from the throttle opening detecting section 4, and a vehicle speed signal sent from the drive environmental detecting section 1. The driving control signal calculating section 5 calculates deceleration degree of the vehicle to be realized in accordance with the results of this judgment, as a main object. The driving control signal calculating section 5 also outputs results of this calculation as a driving control signal.

The vehicle driving controller is further provided with a vehicle control section 7 shown as VEHICLE CONT for controlling the operation of a mechanism capable of reducing a driving speed of the vehicle in a state in which the throttle is closed fully or partially in order to realize the deceleration degree based on the driving control signal from the driving control signal calculating section 5. For example, the vehicle control section 7 controls an operation of at least one of a transmission, a foot brake equipment, and a regenerative brake equipment of the vehicle, etc. as this mechanism. In FIG. 1, an actuator 6 is shown as a representative example of such a mechanism. Accordingly, the following explanation is directed to a case in which an engine-braking magnitude is controlled by operating the transmission of the vehicle as the representative example.

More specifically, the drive environmental detecting section 1 is provided with a navigator utilizing a GPS receiver and map information which serves as a device for detecting a position of the self-vehicle and a surrounding environment thereof, a CCD camera for picking-up a road image, a radar device for detecting presence or absence of another vehicle, a position of another vehicle and the distance between the self-vehicle and another vehicle, and various sensors for detecting states of the self-vehicle, i.e., various sensors for detecting a speed, a steering angle of the self-vehicle, etc.

This drive environmental detecting section 1 outputs signals from such devices and sensors to the curved road detecting section 2 and the driving control signal calculating section 5.

The curved road detecting section 2 receives signal outputs from the navigator, the CCD camera and the radar device of the drive environmental detecting section 1 and detects the presence or absence of a forward curved road on the driving course. The curved road detecting section 2 then calculates a distance up to the curved road and curvature of this curved road, and outputs the calculated distance and curvature to the driving control signal calculating section 5. Further, the curved road detecting section 2 has a function for detecting termination of the curved road on the basis of the signal outputs from these devices and a signal output from the steering angle sensor.

The driving control signal calculating section 5 judges the driver's intention in the throttle operation with reference to a learning value which has been stored to a memory mounted to this vehicle driving controller on the basis of a curved road detecting signal from the curved road detecting section 2, a throttle opening detecting signal from the throttle opening detecting section 4, and a vehicle speed signal from a vehicle speed sensor. For example, the driving control signal calculating section 5 calculates deceleration degree of the transmission of the vehicle in accordance with results of this judgment and outputs this deceleration degree as the driving control signal. Further, the driving control signal calculating section 5 measures a distance from a starting position of the deceleration of the self-vehicle to the curved road having a certain curvature just before the vehicle advances into this curved road. The driving control signal calculating section 5 also measures an advancing speed of the self-vehicle into this curved road. The driving control signal calculating section 5 then stores the measured distance and the measured advancing speed to the memory together with the above curvature. The driving control signal calculating section 5 also has a learning function for calculating an average value of each of the measured distances, the measured advancing speeds and the above curvatures and storing the average values to the memory as the above learning value.

Each of the curved road detecting section 2, the driving control signal calculating section 5 and the vehicle control section 7 has a microcomputer and performs its function by arithmetically processing an inputted signal in accordance with a predetermined program.

An operation of the vehicle driving controller of the embodiment thus constructed will next be described in detail.

Figure 2:
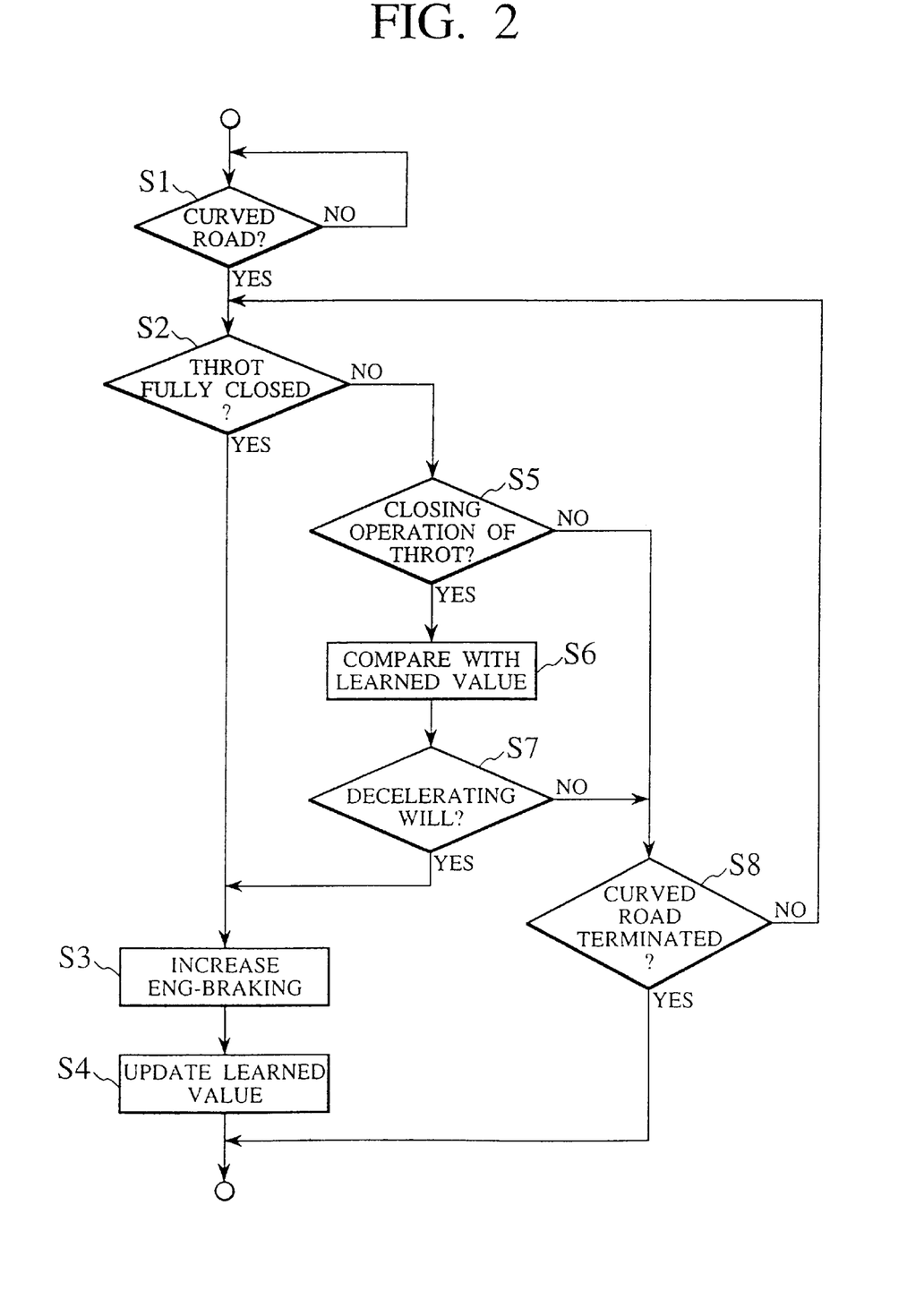
FIG. 2 is a flow chart of driving control at an advancing time into a curved road in this embodiment.

FIG. 2 is a flow chart showing an operation of the vehicle driving controller from an advance into a curved road to starting of decelerating control in the case of decelerating control for increasing braking effect of the engine brake in comparison with that in a normal control time when the driver releases the accelerator to close the throttle just before the curved road.

In FIG. 2, in such a control, the curved road detecting section 2 first detects whether or not a curved road exists in a forward direction of a driving course of the vehicle in a step 1 (S1).

Next, if the curved road is detected in the forward direction of the course by the curved road detecting section 2 in the step 1, the throttle opening detecting section 4 detects whether the throttle is fully closed or not in a step 2 (S2).

In contrast to this, if no curved road is detected in the forward direction of the course by the curved road detecting section 2 in the step 1, processing in the step 1 is repeated until a curved road is detected.

Here, when the curvature of the curved road which has detected in the forward direction is large, the driver generally releases the accelerator perfectly to reduce a driving speed so as to safely advance into the curved road and pass through the curved road. As a result, the throttle opening detecting section 4 normally detects the full closing of the throttle.

Next, if the throttle opening detecting section 4 detects the full closing of the throttle in the step 2, the driving control signal calculating section 5 judges in a step 3 (S3) that the driver has a decelerating intention, and calculates deceleration degree so as to provide deceleration larger than that at the normal fully closed time of the throttle. The driving control signal calculating section 5 then outputs a driving control signal serving as commands for a large deceleration to the vehicle control section 7 so as to realize the larger deceleration.

Next, the vehicle control section 7 controls an operation of the actuator 6 when the vehicle control section 7 receives the driving control signal serving as the commands for large deceleration from the driving control signal calculating section 5 in this way. Namely, when the operation of the transmission of the vehicle is controlled, the operation of the actuator 6 is controlled such that a transmission ratio in the transmission is changed and an engine-braking magnitude is made larger than that at the normal full closed time of the throttle (S3).

In a step 4 (S4), after such control has been executed, the driving control signal calculating section 5 stores the driving control signal including the deceleration, which is a calculating result obtained on the basis of the curvature of the curved road and the distance up to the curved road included in signals inputted from the curved road detecting section 2 and a throttle opening included in the signal inputted from the throttle opening detecting section 4, to the memory of the present vehicle driving controller as a learning value. Namely, the driving control signal calculating section 5 updates this learning value. Further, in this step 4, a starting position of the deceleration of the self-vehicle just before the advance into the curved road, the distance from the starting position of the deceleration of the self-vehicle just before the advance into the curved road to this curved road, the advancing speed of the self-vehicle into this curved road, and the curvature of this curved road, which are obtained in the similar manner as the above, are also stored to the memory of the present apparatus as learning values. Namely, these learning values are updated (S4). Here, each of average values of these values is also stored to the memory as a learning value and this learning value is updated.

In this updating processing of each learning value, a predetermined reference value can be set with respect to the deceleration degree, and learning and updating are not conducted with respect to any sudden deceleration exceeding this reference value as exceptional data so that accuracy of the learning value can be maintained.

In reality, when the driver finds a forward curved road, there is a case in which the driver slightly releases the accelerator without completely releasing the accelerator, i.e., does not fully close the throttle when the curvature of this curved road is small or the distance up to the curved road is long, etc.

In such a situation, the driver has a sense of incompatibility when strong decelerating control is executed by only detecting the forward curved road.

Therefore, in such a situation, it is necessary that the decelerating control can be performed in accordance with personality of the driver on the basis of data of the learning value.

Therefore, in this embodiment, processing proceeds to a step 5 (S5) when the curved road is detected in the forward direction of the driving course by the curved road detecting section 2 in the step 1 and it is detected by the throttle opening detecting section 4 in the step 2 that the driver sees this curved road and does not completely release the accelerator, i.e., the throttle is not fully closed.

Next, when it is detected in the step 5 that the driver does not release the accelerator completely, i.e., when no throttle is not fully closed but a closing operation of the throttle is performed, processing proceeds to a step 6 (S6).

In this step 6, the driving control signal calculating section 5 performs a comparing operation with the current value by using the learning values up to the latest learning value which have been in the above-mentioned memory.

In the next step 7, a decelerating will or intention of the driver is judged from results of this comparison operation (S7).

Specifically, latest learning values with respect to a distance from a decelerating starting position of the driver to a curved road having a certain curvature, and an advancing speed into the curved road are read out from the above-mentioned memory in the step 6. The distance from the current position of the vehicle to the curved road and the current vehicle speed are compared with their corresponding latest learning values.

Thereafter, in a step 7, when the distance from the current position of the vehicle to the curved road is a value showing a further approach to this curved road in comparison with its learning value and the current speed of the vehicle is larger than the learning value of the advancing speed into this curved road, it is judged that the driver has a decelerating intention.

Next, when it is judged in the step 7 that the driver has a decelerating intention, processing proceeds to the step 3. In the step 3, the vehicle control section 7 controls the operation of the actuator 6 of the transmission, etc. in the vehicle so as to increase the engine-braking magnitude (S3).

In the step 4, the driving control signal calculating section 5 stores the curvature of the curved road, the distance from a starting time point of the deceleration to the curved road, and the advancing speed into the curved road to the above-mentioned memory as data of the learning values in the case that it is judged in the step 7 that the driver has a decelerating intention. The learning values are then updated and are again learned (S4), and then a series of processings is terminated.

When it is judged that the curved road is detected in the forward direction of the driving course in the step 1 and the throttle is not fully closed in the step 2 and the closing operation of the throttle is not performed in the step 5, processing proceeds to a step 8 (S8).

Processing also proceeds to the step 8 when it is judged in the step 7 that the driver has not a decelerating intention. Specifically, even when it is judged in the step 5 that the driver slightly releases the accelerator, if the current position of the vehicle is far away from the curved road in comparison with the learning value and the present vehicle speed is smaller than the learning value of the advancing speed into the curved road, it is judged that the driver has not a decelerating intention, through the steps 6 and 7, and then no decelerating control is performed.

Next, in the step 8, the curved road detecting section 2 detects whether the passage on the driving curved road is terminated or not. When it is judged in the step 8 that the passage on the curved road is not terminated, processing is returned to the step 2. In contrast to this, when it is judged in the step 8 that the passage of the curved road is terminated, a series of processings is terminated.

Namely, control shown in the above processings is repeatedly continued until the vehicle has completely passed through the curved road. Such control is terminated when the curved road detecting section 2 detects the termination of the passage on the curved road on the basis of the measurement of a self-vehicle position effected by the a navigator, a forward situation in the course obtained by the CCD camera and a signal outputted from the steering angle sensor, and outputs a signal showing the termination of the curved road to the driving control signal calculating section 5.

Such control is restarted from a time point at which a forward curved road is newly detected in the step 1.

Figure 3:
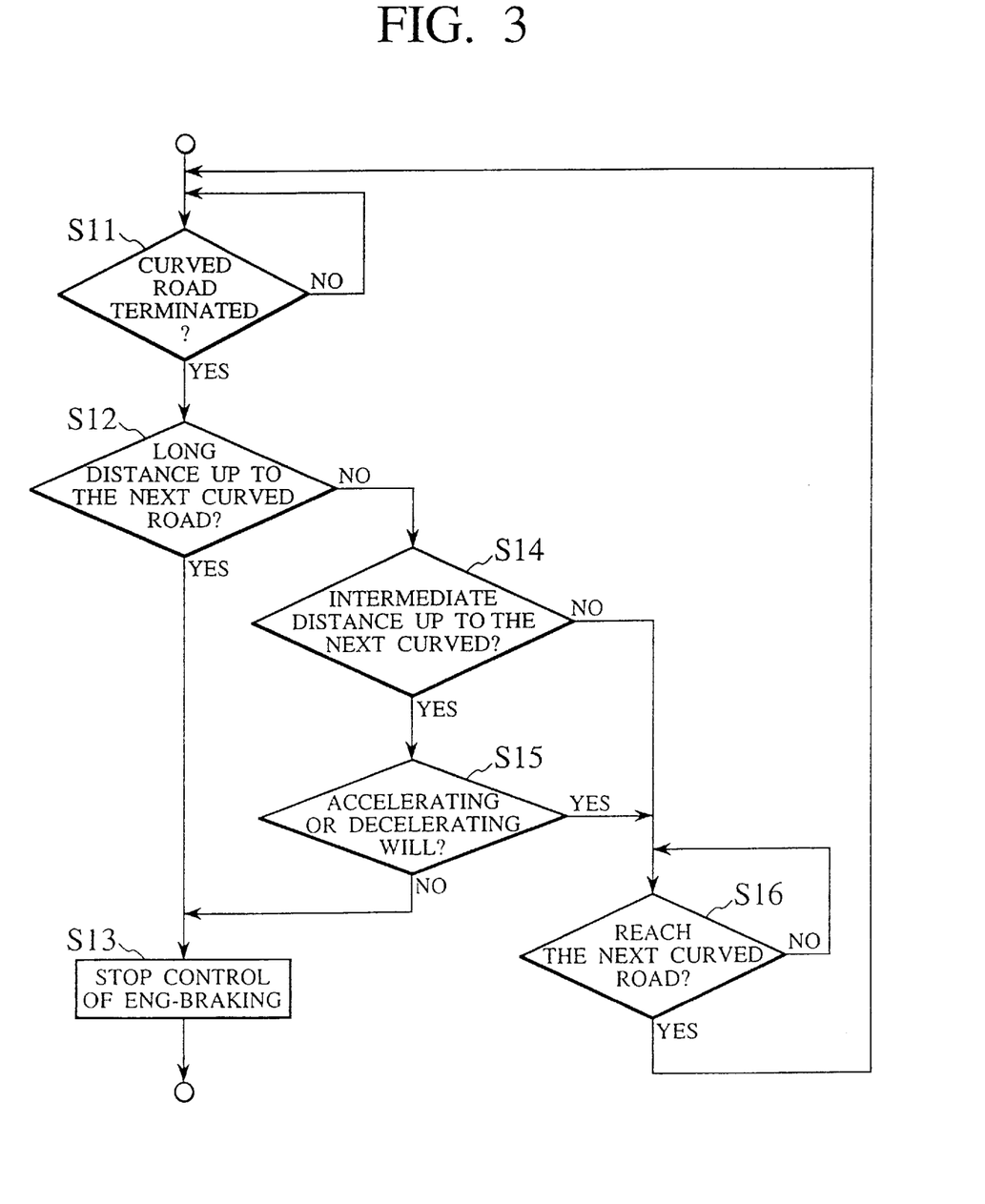
FIG. 3 is a flow chart of the driving control at a terminating time of the curved road in this embodiment.

Further processing performed by the driving control signal calculating section 5 intention next be explained in detail by using FIG. 3.

The driving control signal calculating section 5 also executes processing of driving control as shown in the flow chart of FIG. 3 when the vehicle control section 7 performs control for increasing the engine-braking magnitude effected, for example, by use of the transmission of the vehicle in the above processing explained by using the flow chart of FIG. 2 in an advance into the curved road.

Namely, in a step 11 (S11), the curved road detecting section 2 detects whether the passage on the curved road is terminated or not. When it is judged that the passage on the curved road is terminated, the curved road detecting section 2 calculates the distance up to the next curved road from the relationship between a position of the next curved road and the current position of the self-vehicle. The curved road detecting section 2 then outputs the calculated distance to the driving control signal calculating section 5.

Next, in a step 12 (S12), the driving control signal calculating section 5 judges whether the distance value up to the next curved road is equal to or greater than a predetermined value D1 set in advance, that is, whether or not the distance value is long.

When it is judged in the step 12 that the distance value up to the next curved road is equal to or greater than D1, that is, whether it is a long distance or not, the vehicle control section 7 stops the control for increasing the engine-braking magnitude in a step 13 (S13) and processing is terminated.

When the vehicle newly approaches the next curved road by a predetermined distance, the processing shown in FIG. 2 is restarted.

In contrast to this, when the driving control signal calculating section 5 judges in the step 12 that the distance value up to the next curved road is smaller than D1, processing proceeds to a step 14 (S14). Specifically, in this step 14, the driving control signal calculating section 5 judges that the distance value up to the next curved road is equal to or greater than a predetermined value D2 (D2<D1) set in advance, that is, whether it is an intermediate distance or not.

Next, when it is judged in the step 14 that the distance value up to the next curved road is smaller than the predetermined value D2, processing proceeds to a step 16 (S16) and the curved road detecting section 2 judges whether the vehicle has reached the next curved road or not.

When it is judged in the step 16 that the vehicle has reached the next curved road, processing is returned to the step 11 and again proceeds to the step 12. In the meantime, the control for increasing the engine-braking magnitude is continued.

For example, it is normally considered that deceleration using the engine brake, etc. is expected from a position separated by about 100 (m) before the curved road. Accordingly, if the distance up to the next curved road is smaller than 100 (m), the control for increasing the engine-braking magnitude is basically continued. In contrast to this, when this distance is greater than 100 (m) by a predetermined amount, this control for increasing the engine-braking magnitude is once stopped and is restarted when the vehicle approaches the next curved road.

Processing proceeds to a step 15 (S15) if the distance up to the next curved road in the step 14 is any value included in an intermediate range smaller than the predetermined value D1 and equal to or greater than the predetermined value D2.

A judgment using such an intermediate value is made to further reduce a sense of incompatibility of the driver. For example, when the distance up to the next curved road slightly exceeds the predetermined distance D2 judged as a short distance in the step 12, the control for increasing the engine-braking magnitude is once stopped and the control of the engine-braking magnitude shown in the flow chart of FIG. 2 is restarted by detecting the next curved road immediately after this stoppage. Therefore, it is considered that there is a possibility that a sense of incompatibility is given to the driver.

Next, in the step 15, accelerating or decelerating intention of the driver is judged with reference to the previous throttle openings at the times of the termination of the passage on the curved road, and the previous changes in the throttle operation until a terminating time of the curved road.

Specifically, the accelerating or decelerating intention is judged by the following ways and processing proceeds to step 13 or 16 in accordance with the results of this judgment.

When the current throttle opening is greater than the throttle opening for maintaining a vehicle speed at the time of termination of the previous curved road, it is first judged that the driver has an accelerating intention. Therefore, it is considered that the driver desires quick driving. Further, since a driving speed of the vehicle is high, it is also considered that there is a high possibility that a time for reaching the next curved road is short. Therefore, the control over the engine-braking magnitude is continued and processing proceeds to the step 16.

In contrast to this, when the current throttle opening is smaller than the throttle opening for maintaining the vehicle speed at the time of the termination of the previous curved road, it is judged that the driver has a decelerating intention.

Accordingly, it is considered that the driver desires further deceleration until the next curved road. Otherwise, it is considered that the vehicle speed is an over-speed in an advance into the next curved road. Therefore, the control over the engine-braking magnitude is continued and processing proceeds to the step 16.

In contrast to these, when the present throttle opening is approximately equal to the throttle opening for maintaining the vehicle speed in the termination of the previous curved road, it is judged that the driver has an intention of desirably maintaining the vehicle speed in the termination of the curved road until the next curved road. Namely, it is judged that the driver has neither accelerating nor decelerating intention. Therefore, processing proceeds to the step 13 and the control of the engine-braking magnitude is stopped.

As mentioned above, the vehicle driving controller in this embodiment judges presence or absence of the decelerating intention of the driver with reference to an operating situation of the throttle corresponding to an operating situation of the accelerator when the curved road is detected. When it is judged that the driver has the decelerating intention, the engine-braking magnitude is controlled so as to greatly reduce the vehicle speed in comparison with that at the normal deceleration time. Accordingly, driving control according to an operating intention of the driver is realized.

Further, the throttle operation history of the driver, the decelerating control history and the environmental situation of the vehicle are learned and reflected in a judgment of the decelerating intention of the driver at a driving time of a curved road. Accordingly, driving control further according to the operating intention of the driver is realized.

Exceptional sudden decelerating data are removed in such learning processing so that the accuracy of learning values can be expected.

Further, when the curved road is terminated during control for obtaining strong or large deceleration in comparison with the normal case, continuation or stoppage of such control are judged on the basis of the distance up to the next curved road and the operating state of the throttle corresponding to the operating situation of the accelerator. Accordingly, the decelerating control can be suitably continued or stopped after the vehicle has passed through the curved road. Therefore, a sense of incompatibility is not given to the driver.

A second embodiment of the present invention will next be explained.

Figure 4:
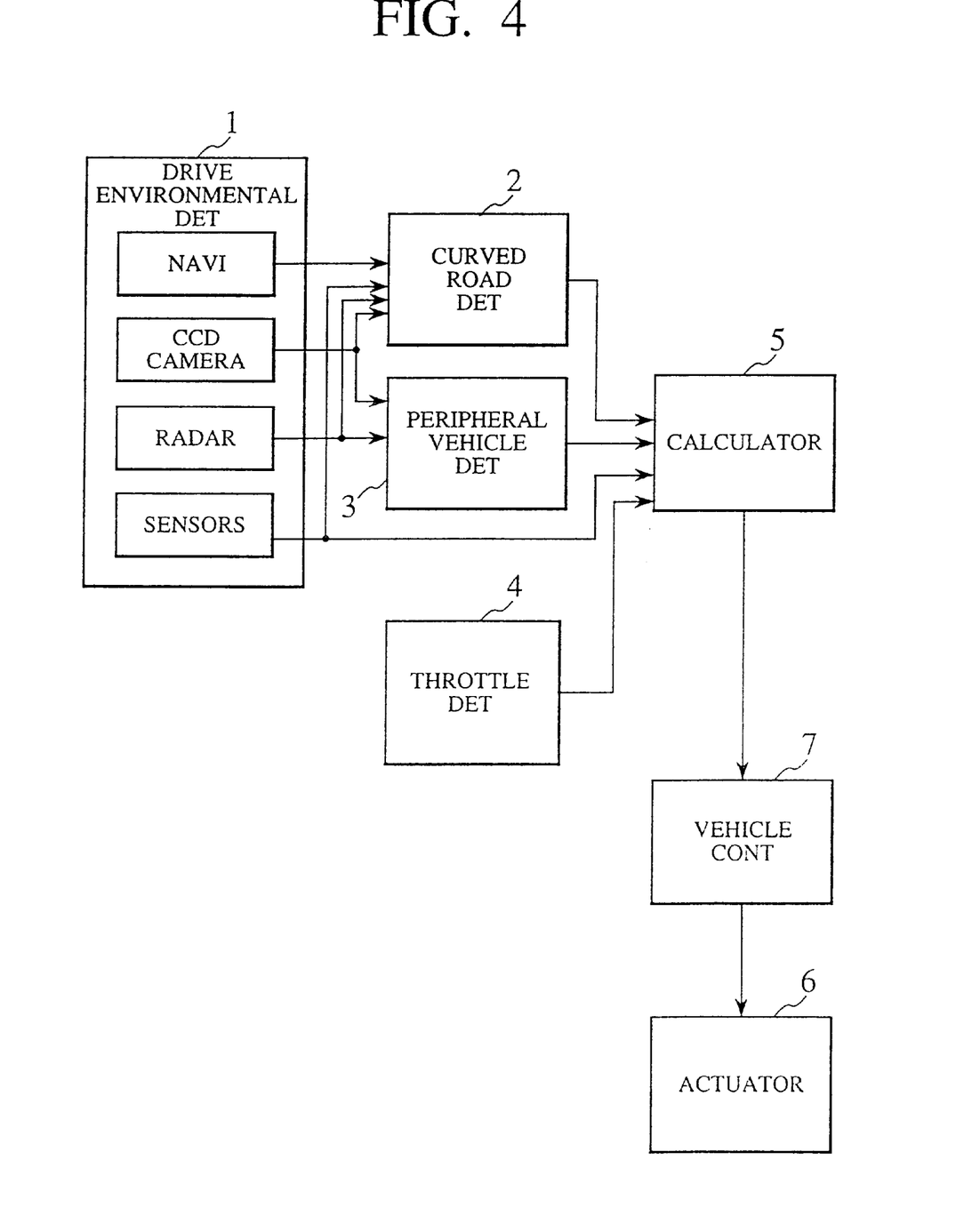
FIG. 4 is a block diagram showing the functional construction of a vehicle driving controller in a second embodiment of the present invention.

As shown in FIG. 4, the construction of a vehicle driving controller in this embodiment differs from that in the first embodiment 1 in that a peripheral vehicle detecting section 3 shown as PHERIPHERAL VEHICLE DET is arranged. The other constructions of the vehicle driving controller in this embodiment are similar to those in the first embodiment.

Namely, in this embodiment, a distance, etc. up to a near vehicle detected by the peripheral vehicle detecting section 3 are further considered in a judgment for continuing or stopping the control of the engine-braking magnitude and executed by the driving control signal calculating section 5 explained in the first embodiment 1 in accordance with the distance up to the next curved road in consideration of accelerating or decelerating intention of the driver after one curved road is terminated.

Similar to the drive environmental detecting section 1 and the curved road detecting section 2, it can be the that the near vehicle detecting section 3 in this embodiment is a first detecting section for detecting the drive environment of a self-vehicle.

Specifically, this peripheral vehicle detecting section 3 detects the distance up to the near vehicle around the self-vehicle on the basis of output signals from a CCD camera and a radar device of the drive environmental detecting section 1. And the peripheral vehicle detecting section 3 further calculates a difference between these output signals outputted in different times and also calculates a relative velocity between the near vehicle and the self-vehicle. Then, this peripheral vehicle detecting section 3 outputs this relative velocity to the driving control signal calculating section 5.

Here, the driving control signal calculating section 5 can execute calculations, etc. similar to those in the first embodiment. However, in this embodiment, calculations, etc. corresponding to processing shown in the flow chart of FIG. 5 are executed instead of the processing shown in the flow chart of FIG. 3.

Figure 5:
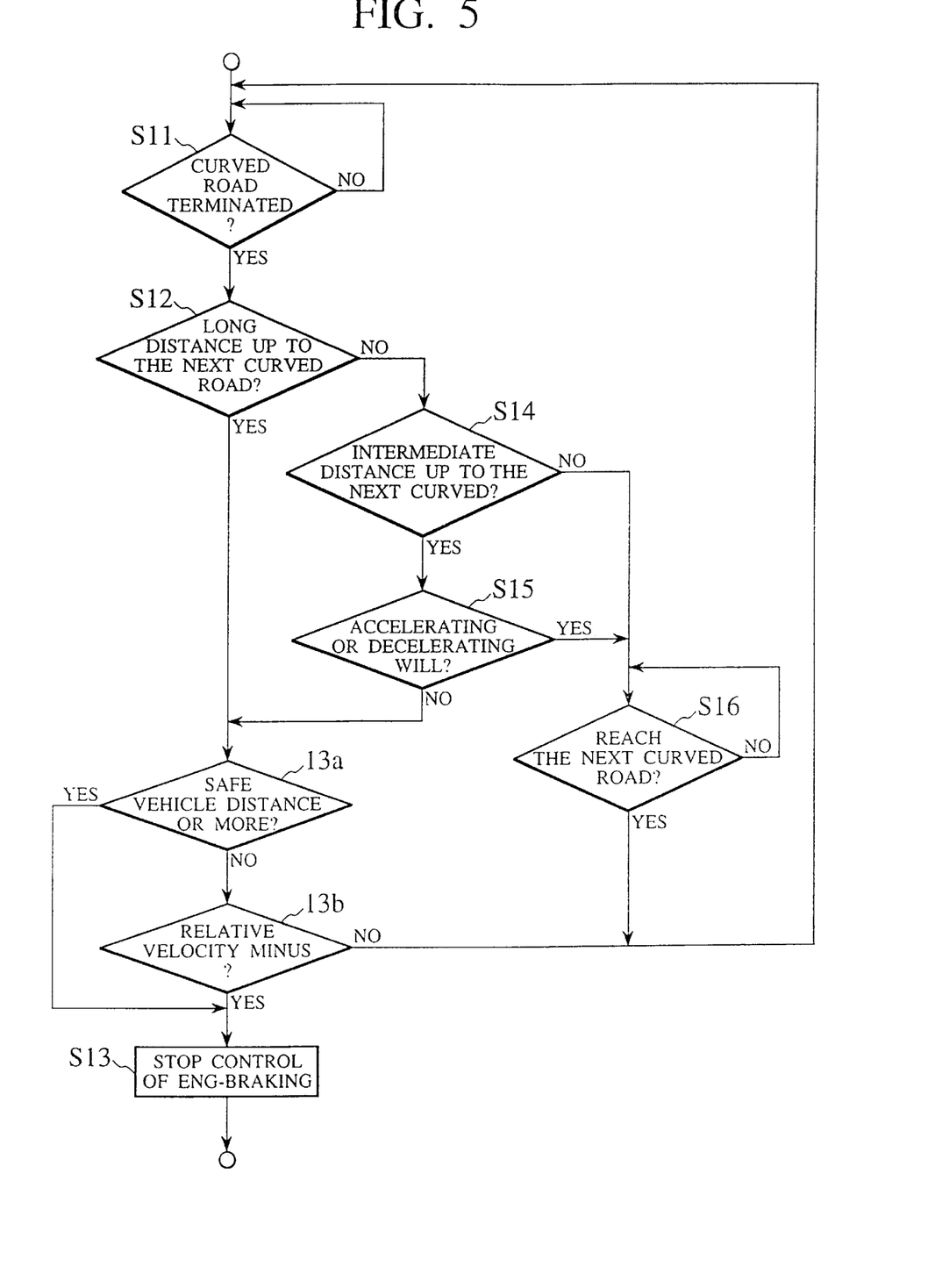
FIG. 5 is a flow chart of driving control at the terminating time of a curved road in this embodiment.

Specifically, the processing of FIG. 5 has processing basically similar to the processing of FIG. 3. However, the processing of FIG. 5 differs from the processing of FIG. 3 in that steps 13a and 13b are added to a front stage of the step 13.

In the processing of FIG. 5, processing proceeds to the step 13a when the termination of a curved road is judged in a step 11 and it is judged in a step 12 that the distance D up to the next curved road is equal to or greater than a predetermined value D1.

In this step 13a, it is judged whether or not the distance between the self-vehicle and the near vehicle detected by the peripheral vehicle detecting section 3 is equal to or greater than a safe distance between vehicles in consideration of a self-vehicle speed. If the distance between the self-vehicle and the near vehicle is equal to or greater than the safe vehicle distance, processing proceeds to the step 13 and the control of the engine-braking magnitude is stopped.

In contrast to this, when it is judged that the distance between the self-vehicle and the near vehicle is smaller than the safe vehicle distance, processing proceeds to the step 13b. In this step 13b, it is judged whether the relative velocity between the self-vehicle and the near vehicle is minus or not. Namely, it is judged whether or not the self-vehicle and the near vehicle are moved so as to separate from each other. When the relative velocity is minus, the self-vehicle and the near vehicle are separating from each other. Accordingly, processing proceeds to the step 13 and the control of the engine-braking magnitude is stopped. In contrast to this, when the relative velocity between the self-vehicle and the near vehicle is not minus, processing is returned to the step 11.

Next, when it is judged in the step 12 that the distance D up to the next curved road is smaller than the predetermined value D1, processing proceeds to a step 14.

If it is judged in this step 14 that the distance up to the next curved road is a value included in an intermediate range smaller than the predetermined value D1 and equal to or greater than a predetermined value D2 (D2<D1), processing proceeds to a step 15. In this step 15, it is judged whether or not the driver has accelerating or decelerating will or intention. When it is judged that the driver has neither accelerating nor decelerating intention, processing proceeds to the step 13a and the above processing subsequent to the step 13a is performed.

When it is judged in the step 14 that the distance up to the next curved road is smaller than the predetermined value D2 and it is judged in the step 15 that the driver has the accelerating or decelerating intention, processing proceeds to the step 16 and subsequent processings are similar to those in the first embodiment.

As mentioned above, in this embodiment, when the vehicle is driven by performing control for obtaining deceleration stronger or larger than the normal deceleration and the curved road is terminated, the vehicle driving controller has a function for judging continuation and stoppage of the control of the engine-braking magnitude on the basis of the distance up to the next curved road, a state of the throttle opening, the distance between the self-vehicle and the near vehicle, and the relative velocity between the self-vehicle and the near vehicle. Accordingly, the continuation and the stoppage of this control can be more suitably determined in accordance with a near environment just after the curved road is terminated.

In the above embodiments, the deceleration stronger or larger than the normal deceleration is obtained by controlling the engine-braking magnitude, but the present invention is not limited to this case. For example, the strong deceleration may be similarly obtained by control for compulsorily operating a foot braking system, control for operating a regenerative brake, etc.

What is claimed is:

1. A vehicle driving controller comprising:
   a first detecting section detecting a drive environment of a vehicle;
   a second detecting section detecting a throttle opening of said vehicle;
   a driving control signal calculating section outputting a driving control signal through a calculation based on an output signal of said first detecting section relating to said drive environment of said vehicle in response to an output signal of said second detecting section relating to said throttle opening of said vehicle; and
   a driving control section controlling driving of said vehicle on the basis of said driving control signal outputted from said driving control signal calculating section.

2. A vehicle driving controller according to claim 1, wherein said first detecting section has a curved road detecting section detecting information about a forward curved road in a driving course of said vehicle; said driving control signal calculating section outputs said driving control signal controlling an increase in deceleration of said vehicle when said curved road detecting section detects said curved road and said second detecting section detects a full closed state of said throttle opening of said vehicle; and said driving control section controls said vehicle so as to increase deceleration of said vehicle by receiving said driving control signal controlling said increase in deceleration of said vehicle.

3. A vehicle driving controller according to claim 1, wherein said first detecting section has a curved road detecting section detecting information about a forward curved road on a driving course of said vehicle; and, when said curved road detecting section detects said curved road and said second detecting section detects an intermediate closed state of said throttle opening of said vehicle, said driving control signal calculating section judges presence or absence of a decelerating intention of a driver of said vehicle with reference to a learning value which has been stored in order to judge said presence or absence of said decelerating intention of said driver.

4. A vehicle driving controller according to claim 3, wherein said learning value includes a previous starting position of deceleration of said vehicle and an previous advancing speed of said vehicle into a curved road; said driving control signal calculating section outputs a driving control signal controlling an increase in deceleration of said vehicle when said driving control signal calculating section judges that said driver has said decelerating intention; and said driving control section controls said vehicle so as to increase deceleration of said vehicle by receiving said driving control signal controlling said increase in deceleration of said vehicle.

5. A vehicle driving controller according to claim 1, wherein said first detecting section has a curved road detecting section detecting information about a forward curved road in a driving course of said vehicle; and, when said curved road detecting section newly detects the next curved road after a detection of a termination of a detected curved road and when said driving control signal calculating section judges that a distance between said vehicle and said next curved road is equal to or greater than a predetermined distance, said driving control signal calculating section outputs a driving control signal stopping control of an increase in deceleration of said vehicle.

6. A vehicle driving controller according to claim 1, wherein said first detecting section has a curved road detecting section detecting information about a forward curved road in a driving course of said vehicle; and, when said curved road detecting section newly detects the next curved road after a detection of a termination of a detected curved road and when said driving control signal calculating section judges that a distance between said vehicle and said next curved road is smaller than a first distance and is equal to or greater than a second distance a value of which is smaller than that of said first distance, said driving control signal calculating section judges presence or absence of acceleration or deceleration intention of a driver of said vehicle and outputs a driving control signal stopping controlling an increase in deceleration of said vehicle on the basis of a result judged by said driving control signal calculating section.

7. A vehicle driving controller according to claim 6, wherein said driving control signal calculating section judges said presence or absence of acceleration or deceleration intention of said driver of said vehicle by comparing a throttle opening of said vehicle detected by said second detecting section and a throttle opening required to maintain a current speed of said vehicle.

8. A vehicle driving controller according to claim 1, wherein said first detecting section has a curved road detecting section detecting information about a forward curved road in a driving course of said vehicle and also has a peripheral vehicle detecting section detecting information about a near vehicle around said vehicle; and, when said curved road detecting section newly detects the next curved road after a detection of a termination of a detected curved road, said driving control signal calculating section outputs a driving control signal stopping controlling of an increase in deceleration of said vehicle on the basis of a distance between said vehicle and said next curved road detected by said curved road detecting section, and said information about said near vehicle detected by said peripheral vehicle detecting section.

9. A vehicle driving controller according to claim 8, wherein said information about said near vehicle is a distance between said vehicle and said near vehicle.

10. A vehicle driving controller according to claim 8, wherein said information of said near vehicle is a relative velocity between said vehicle and said near vehicle.

11. A vehicle driving controller, comprising:

first detecting means detecting a drive environment of a vehicle;

second detecting means detecting a throttle opening of said vehicle;

driving control signal calculating means outputting a driving control signal through calculations based on an output signal relating to said drive environment of said vehicle from said first detecting means in response to an output signal of said second detecting means relating to said throttle opening of said vehicle;

and driving control means controlling driving of said vehicle on the basis of said driving control signal outputted from said driving control signal calculating means.

* * * * *